May 7, 1935.  F. C. CHADBORN  2,000,319
AUTOMATIC MIXING VALVE
Filed Aug. 19, 1933  2 Sheets-Sheet 2
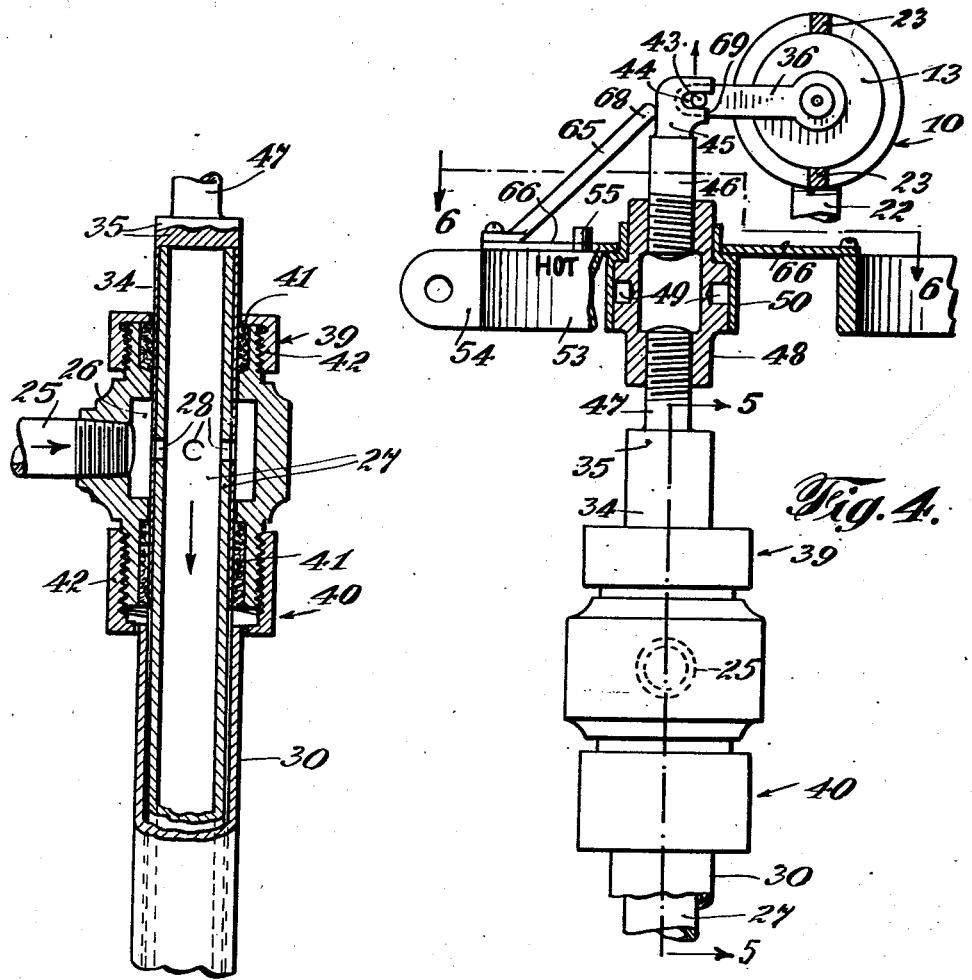
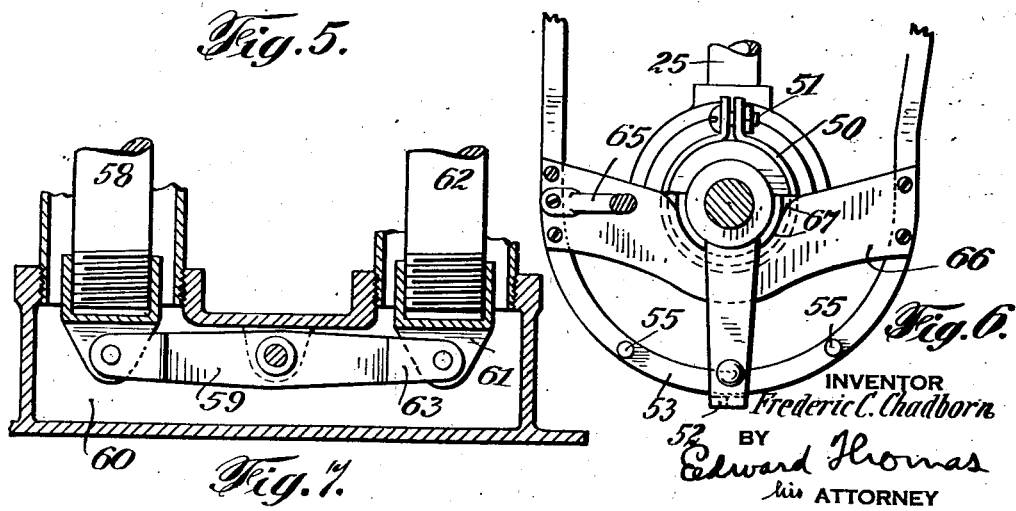
INVENTOR
Frederic C. Chadborn
BY Edward Thomas
his ATTORNEY Patented May 7, 1935

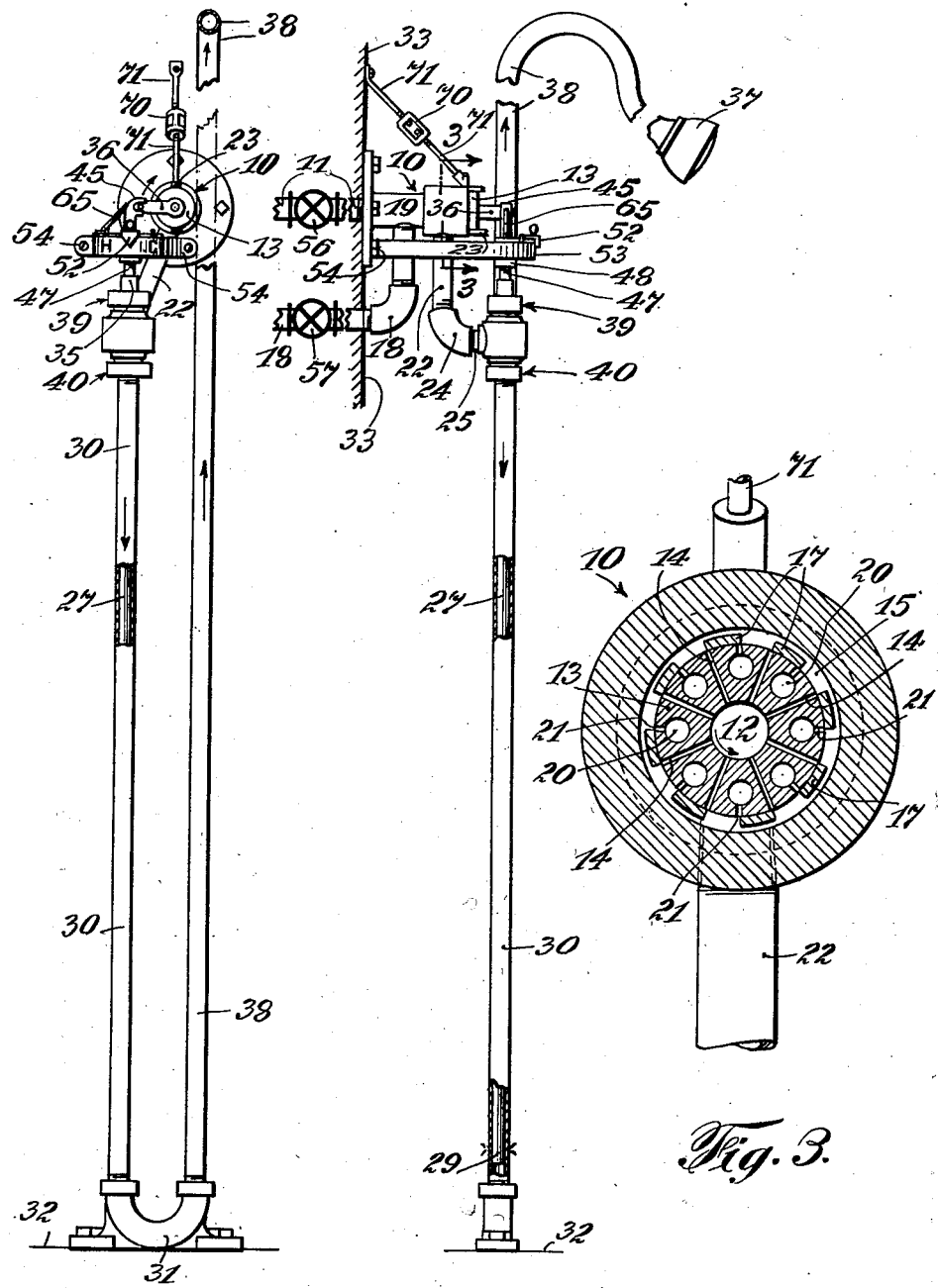

2,000,319

UNITED STATES PATENT OFFICE 2,000,319

AUTOMATIC MIXING VALVE

Frederic C. Chadborn, Newburgh, N. Y.

Application August 19, 1933, Serial No. 685,876

14 Claims. (Cl. 236—12)

This invention relates to automatic mixing valves and is herein illustrated as embodied in an automatic mixing valve forming part of a shower bath.

Most of the shower bath mixing valves are usually manually operated so that the user of the bath may mix streams of hot and cold water in any desired proportions. These are unsatisfactory, because the stream of hot water usually changes in temperature, and the stream of cold water sometimes changes in temperature, the streams changing as they gradually warm or cool the length of pipes through which they run. Moreover, the streams of hot and cold water may be flowing satisfactorily, when suddenly one of the streams flows more slowly or more rapidly because the pressure on one stream or the other is suddenly changed, as by the turning on or off of another faucet drawing water from the same line.

As a result of these and other difficulties many attempts have been made to produce a fool-proof shower-bath valve adapted to automatically deliver water at any desired temperature.

Devices have been put on the market containing thermostatic controlled elements, but some of these devices worked slowly, other devices theoretically worked rapidly but depended upon the expansion and contraction of bulky bi-metal resilient coiled operating members or upon the operation of gears and multiplying levers. Such resilient members could not be depended upon to act positively, needed frequent inspection, cleaning and replacing and the gears and levers sometimes became clogged or bent, thus making unreliable the structures embodying them. As a result many users of shower baths have been seriously burned, sometimes fatally. Such burning has led to frequent suits for damages against hotels, especially, claiming very large sums of money.

According to the present invention these and other difficulties and objections are overcome. In the structure of the present invention no bulky bi-metal resilient devices or multiplying levers or gears are needed, and any desired water pressure will have no effect on the operation. According to the present invention the direct or positive thrust of a straight-away thermally sensitive member operates the lever of a valve which controls the flow of the liquid.

The valve herein illustrated is a modified form of the valve shown in my application, Serial No. 586,789 filed January 15, 1932, and is adapted to vary the flow of water widely by a very small throw of its operating lever. According to the form of the invention herein disclosed in some detail, the operating lever of the valve is fast to the valve gate and is operated by the direct pull or thrust of a long straight member, shown as substantially the height of the usual spray head from the floor of the room in which it is set. The long straight member of this length works satisfactorily to give the aforesaid valve the needed throw if made of some material having a considerably greater coefficient of expansion than brass. Lead has been found satisfactory, using the room wall as the fixed member of the thermostatic device.

It has been found possible to use brass as the expanding member, using two lengths of brass rod by conducting the current of water through a U-shaped pipe formed by two vertical pipes united by a return bend, the arms of the U reaching nearly the usual height of a shower head above the floor. The throws of the two brass rods can be easily added together. In the structure shown, one is set in each branch of the U, and pivoted to an inverted walking beam within the return bend. The other end of one rod is pivoted to a suitable valve operating lever and the other end of the other rod is fast to a fixed point in the wall of the room. Thus water coming through the U pipe may control the temperature of ten feet or more of brass rod, giving a change in length which is ample to throw the lever of the mixing valve.

When lead is used as the expanding element it is usually stabilized by a surrounding brass tube, and the expanding lead member preferably serves as the tube conveying the water from the mixing valve.

Other features and advantages will hereinafter appear.

In the accompanying drawings:

Figure 1 is a front view, somewhat diagrammatic, of the connections of a shower bath embodying the present invention.

Figure 2 is a side view of the same.

Figure 3 is a section viewed from the rear, on the line 3—3 of Figure 2.

Figure 4 shows the parts at the top of Figure 1 on a larger scale.

Figure 5 is a section on the line 5—5 of Figure 4.

Figure 6 is plan view on the line 6—6 of Figure 4.

Figure 7 shows part of the alternative form in which brass rods are used instead of lead pipe.

In the form of the invention shown, cold water enters a balanced valve 10 by an axial pipe 11 and flows into the central longitudinal well 12 of plug 13, and, in the position shown, flows from the well 12 through eight symmetrically arranged radial slots 14 into the eight peripheral longitudinal passages 15 in the sleeve or shell 16 of the valve 10, formed by bars 17 which are spaced from the interior of the shell 16, so that water runs freely behind the bars 17 in an annular passage.

Hot water is also shown entering the valve 10 by a lower radial pipe 18 threaded into a sleeve 19, flowing from the radial pipe 18 into an annular passage around the reduced end, of an extension (not shown here) of the plug 13, from which it enters eight small wells 20, between the slots 14, and opening out of the annular passage around said reduced end, as is illustrated in some detail in said application Serial No. 586,789.

From the wells 20 the hot water is shown as flowing through eight symmetrically arranged radial slots 21, also between the slots 14 and entering the same peripheral longitudinal passages 15. Thus hot and cold water are both entering the passages 15, mixed there, and flow on because the outflow pipe 22 leads from the annular passage behind the bars 17.

The plug 13 of the valve 10, as described in said application Serial No. 586,789 is tapered, with its wider end away from the incoming cold water pipe 11, so that the water thrust holds it against a floating pivot, not shown here, but adjustable by a screw end thrust bearing carried in a cross piece mounted upon lugs 23, all as described in said application Serial No. 586,789.

The valve thus constructed is moved from open to shut, for either hot or cold, by a throw of 0.025 inch on a lever 1½ inch long, and the long narrow slots 14 and 21 may be of any length needed to deliver the required volume of water for an ordinary shower bath. In practice for a half inch stream the eight slots a little over one inch long have been found satisfactory in a plug 2⅜ inches long and tapering from 1¼ to 1⅛ inches in diameter. Such a valve did not seem to need the bag-like strainer in the pipe often provided for sensitive valves.

The outflowing water running through the pipe 22 is shown as controlling its own temperature. To attain this end, in the construction illustrated in detail, the outflow pipe 22 is adapted to heat or cool a member having a high coefficient of thermal expansion, so that the valve 10 is operated without gears or multiplying levers.

For this purpose, in the form shown, the outflow water passes from the outflow pipe 22, through an elbow 24, and pipe 25 into a pocket 26 through which extends a lead pipe 27 provided with openings 28 within the pocket 26. The lead pipe 27, in the form illustrated is over sixteen inches long and is held at its lower end 29 by being sweated against a surrounding brass pipe 30 which springs from a double elbow 31, shown as held fast upon the floor 32.

When the water entering the lead pipe 27 is too hot, the lead expands and shuts off the hot water while the room wall 33 is substantially unchanged. To thus shut off the hot water the upper end of the lead pipe 27 carries up with it a thin brass jacket 34 which surrounds it and lifts a brass butt 35 forming the end of the pipe. This rising butt 35 lifts a lever 36 fast upon the plug 13 of the valve 10, turning the valve so that it opens the slots 14, by carrying them more nearly clear of the bars 17, admitting more cold water, and at the same time closing the hot water slots 21 by carrying them more nearly under the bars 17. This cools the water entering the outgoing pipe 22, and, therefore, cools the water going through the lead pipe 27 to the shower spray 37 through an uptake brass pipe 38 leading from the other side of the return bend 31.

The pocket 26 is formed by the two glands 39 and 40 which close its ends, so that the pocket 26 really is an annular passage around the lead pipe 27 and the thin brass jacket 34, and delivers water through the openings 28, which extend through both the lead pipe 27 and the brass jacket 34.

The brass jacket 34 permits the packing 41 to be screwed up by the heads 42, keeping it out of contact with the soft lead. In ordinary work the heads 42 are round to keep them from being tampered with. The lower surrounding brass pipe 30 is found to work satisfactorily as a support for the lead pipe 27 is spaced from it by 1/32 inch, and terminating at the top so that it expands idly loosely in the lower nut of the gland and it is always clear of the bottom of the brass jacket 34.

In the form illustrated the butt 35 operates the lever 36 positively by a pivot 43 lying in a horizontal slot 44 in the extension 45 of a stub bolt 46. The butt 35 terminates in a similar stub bolt 47, the two stub bolts being held together by a nut 48 having right and left threads, so that turning the nut 48 lengthens or shortens the length from the lead pipe 27 to the pivot 43 to adjust the setting of the valve 10 to any desired temperature.

The nut 48 may be adjusted by inserting a pin in a hole 49 to turn it, but such turning by unauthorized persons is prevented by a split hub cover 50 which may be made fast to the nut by tightening the screw 51, the cover 50 carrying a pointer 52 which serves as an indicator or selector.

The pointer or selector as shown projects over the edge of a horseshoe 53 held fast to the wall 33 by feet 54, and provided with pins or stops 55 to limit the throw of the pointer 52, but allowing it to be adjusted to any ordinary temperature suitable for a bath.

It is found that cold water may be entirely shut off as by a valve 56, and the valve 57 of the hot water opened, yet the fall of hot water in the lead pipe 37 shuts off the hot water long before the pipe 27 is filled, thus making it impossible for anyone to be burned by hot water resulting from faulty operation of the valve.

The outflow pipe 22, fast to the valve 10, which is fast in the wall 33, supports the gland and brass pipe 30. Other brackets may be added.

If it is desired to utilize the thermal expansion of brass, instead of lead, for operating the valve 10, two brass rods, each toward five feet long will be found satisfactory. These may be easily utilized, by placing one in each of the tubes 30 and 38, adjustably abutting one rod 58 at the wall beyond the upper end of the tube 38, pivoting the lower end in a walking beam 59 (see Figure 7) within a suitable return bend 60 fast to the floor 32, pivoting the end 61 of the other rod 62 to the other end 63 of the walking beam and operating the valve 10 by the upper end of the rod 62 against a spring to avoid lost motion suitable glands being provided, and the walking beam swinging freely on its pivot 64 within the return bend 60.

The valve described is found to operate satisfactorily without lubricating it, especially if given a prolonged heating in hot oil under pressure so that the pores of the metal are filled with lubricant.

For some purposes it is advisable to steady the extension 45, thus preventing annoying and noisy vibration and too quick shutting off of water. To attain this end it has been found satisfactory to provide a rear buffer or support 65, springing from the end of a cross-bar 66 which binds the sides of the horseshoe 53 together and is notched at 67 to admit the nut 48, and the upper part of the cover 50.

The buffer 65 operates satisfactorily if its rounded head 68 bears firmly against the smooth back of the extension 45.

To further steady the device, there may be provided a tie rod in the form of a turnbuckle 70 uniting two rods 71, one end of the tie rod being anchored in the wall, and the other fast to the shell 16 of the valve 10.

If very high water pressure is used it may be useful to apply to the large end of the plug 13 a gland in the form of a cup piston facing inward so that its turned up edge lies against the inner wall of the shell 16. It is found that such a gland fails to measurably increase friction of the valve in turning, yet wholly prevents drip from the valve 10.

To facilitate removal of the plug 13 from the valve, the lower arm 69 of the slot 44 of the extension 45 may be short, thus permitting a small lifting of the extension 45 to carry the pin 43 clear of the extension 45.

Having thus described certain embodiments of the invention, what is claimed is:

1. The combination with a valve having a rotatable gate, of a lever fast to the gate, a lead element pushing and pulling the lever, and varying in length sufficiently with changed temperature to operate the lever and alter the position of the gate to vary the flow of water through the valve, a water conduit leading from the valve so that the water bathes a face of the element to control its length, and a support of harder metal lying against the lead element throughout most of its length to support it.

2. The combination with a valve having a rotatable gate, of a lever fast to the gate, a pivot on the lever, an element engaging the pivot to push and pull the lever, an outflow pipe from the valve, an integral straight-away lead temperature controlled member bathed by the water carried off by the outflow pipe and moving said element by the distance it expands or shrinks, and a support of harder metal lying against the lead member throughout most of its length to support it.

3. The combination with a valve having a body containing slot-like water passages, of a rotatable plug for the body having parallel slot-like water passages, certain of the plug slots carrying hot water and intervening slots carrying cold water, a lever fast to the plug adapted to turn it so that the plug slots may deliver either hot or cold water to the body slots, or may deliver mixed water in varying proportions, an outflow pipe through which the water flows which is delivered by the slots, and a member bathed by water issuing from the outflow pipe and attached to the lever to cause the temperature of the outflow water to alter its length and pull the lever to alter the flow of hot or cold water or both.

4. The combination with a valve having a body containing slot-like water passages, of a rotatable plug for the body having parallel slot-like water passages, certain of the plug slots carrying hot water and intervening slots carrying cold water, a lever fast to the plug adapted to turn it so that the plug slots may deliver either hot or cold water to the body slots, or may deliver mixed water in varying proportions, an outflow pipe through which the water flows which is delivered by the slots, and an extension of the outflow pipe attached to the lever and of sufficient length to turn the plug by lengthwise expansion at changes of temperature to exclude hot water or to exclude most of the cold water.

5. The combination with a valve having a body containing slot-like water passages, of a rotatable plug for the body having parallel slot-like water passages, a lever fast to the plug for rotating to selectively bring body slots more or less opposite plug slots so that hot or cold water or both flows through the slots, an outflow pipe for the water from the slots, a lead member bathed by water flowing through the outflow pipe and attached to the lever and of sufficient length to turn the plug by lengthwise expansion at changes of temperature to exclude hot water or to exclude most of the cold water, and a brass jacket supporting the lead member, embracing it closely throughout most of its length.

6. The combination with a valve having narrow slot-like passages adapted to selectively or simultaneously admit hot and cold water, of an outflow pipe, a lever for operating the valve, a lead member bathed in water flowing from the outflow pipe and attached to the lever adapted by its change of length at changes of temperature to shift the lever to admit exclusively cold or exclusively hot water, and a brass jacket supporting the lead member, and embracing it closely throughout most of its length.

7. In a temperature regulator for water, the combination with a valve for hot and cold water, of a lead pipe carrying its outflow water, a harder metal support embracing the lead pipe throughout most of its length to support it, and a lever pushed and pulled by the lead pipe to alter the flow of hot and cold water through the valve.

8. In a temperature regulator for water, the combination with a house wall, of a valve for hot and cold water anchored to the wall, a lead pipe supported on the wall at a distance of several feet from the valve, an outflow pipe carrying the water from the valve to the pipe, and a lever operated by the pipe to alter the flow of water by the valve.

9. In a temperature regulator for water, the combination with a house wall, of a valve for hot and cold water anchored to the wall, a pipe having a greater coefficient of thermal expansion than brass also anchored in the wall at a distance of several feet from the valve, an outflow pipe carrying the water from the valve to the pipe, and a lever operated by the pipe to alter the flow of water by the valve.

10. In a temperature regulator for water, the combination with a house wall, of a valve for hot and cold water anchored to the wall, an outflow pipe for the valve, a substantially straight member bathed by the outflow water also anchored in the wall at a distance of several feet from the valve and having a greater coefficient of expansion than brass, and a lever operated by the member to alter the flow of water by the valve.

11. In a temperature regulator for water, the combination with a house wall, of a valve for hot and cold water anchored to the wall, an outflow pipe for the valve, extensions of said pipe leading to the base of the wall and up to a shower head, a brass rod anchored in the wall about the height of the shower and bathed in the water of the extension, a second brass rod attached to operate the valve and bathed in the water of the other extension, and a walking beam pivoted to the ends of the brass rods so that their changes of length by changed temperature of the outflowing water are added together to operate the valve.

12. In a temperature regulator for water, the combination with a house wall, of a valve for hot and cold water anchored to the wall, an outflow pipe for the valve, extensions of said pipe leading to the base of the wall and up to a shower head, a brass rod anchored in the wall about the height of the shower and bathed in the water of the extension, a second brass rod attached to operate the valve and bathed in the water of the other extension, a U pipe connecting the extensions, and a walking beam pivoted within the U pipe and pivoted to the ends of the brass rods so that their changes of length by changed temperature of the outflowing water are added together to operate the valve.

13. The combination with a valve having a rotatable gate to admit hot or cold water, of a lever fast to the gate, a lead element having a supporting jacket of brass adapted to push the lever to shut off more or less hot water, and a water conduit leading from the valve so that the water bathes a face of the element to control its length.

14. The combination with an upstanding lead pipe through which water flows and forming part of a thermostatic device, of a brass jacket to which it is fast at the base and lying against it to support it throughout the major part of its length, a thin brass jacket surrounding the upper end of the lead pipe, a butt at the upper end of the lead pipe fast to the thin jacket, and a valve lever moved by the butt.

FREDERIC C. CHADBORN.